US008531770B2

(12) United States Patent
Minami et al.

(10) Patent No.: US 8,531,770 B2
(45) Date of Patent: Sep. 10, 2013

(54) DIFFRACTIVE OPTICAL ELEMENT AND OPTICAL DEVICE

(75) Inventors: Kazuhiro Minami, Osaka (JP); Kazuhiro Yamada, Osaka (JP)

(73) Assignee: Panasonic Corporation, Osaka (JP)

( * ) Notice: Subject to any disclaimer, the term of this patent is extended or adjusted under 35 U.S.C. 154(b) by 383 days.

(21) Appl. No.: 13/071,923

(22) Filed: Mar. 25, 2011

(65) Prior Publication Data
US 2011/0235180 A1    Sep. 29, 2011

(30) Foreign Application Priority Data
Mar. 29, 2010   (JP) .................................. 2010-074039

(51) Int. Cl.
*G02B 5/18* (2006.01)

(52) U.S. Cl.
USPC .......................................................... 359/576

(58) Field of Classification Search
USPC .................................................. 359/571, 576
See application file for complete search history.

(56) References Cited

U.S. PATENT DOCUMENTS
5,847,877 A    12/1998  Imamura et al.

FOREIGN PATENT DOCUMENTS
JP            09-127321          5/1997

*Primary Examiner* — Alessandro Amari
(74) *Attorney, Agent, or Firm* — Renner, Otto, Boisselle & Sklar, LLP

(57) ABSTRACT

A diffractive optical element includes a first optical member having a first diffraction grating with a sawtooth cross section; and a second optical member which has a second diffraction grating having a sawtooth cross section and which has a refractive index different from that of the first optical member. In the diffractive optical element, the first and second optical members are stacked so that the first and second diffraction gratings closely contact each other. Arithmetical mean roughness of a diffraction surface of the first diffraction grating is set so as to fall within a predetermined range.

4 Claims, 5 Drawing Sheets

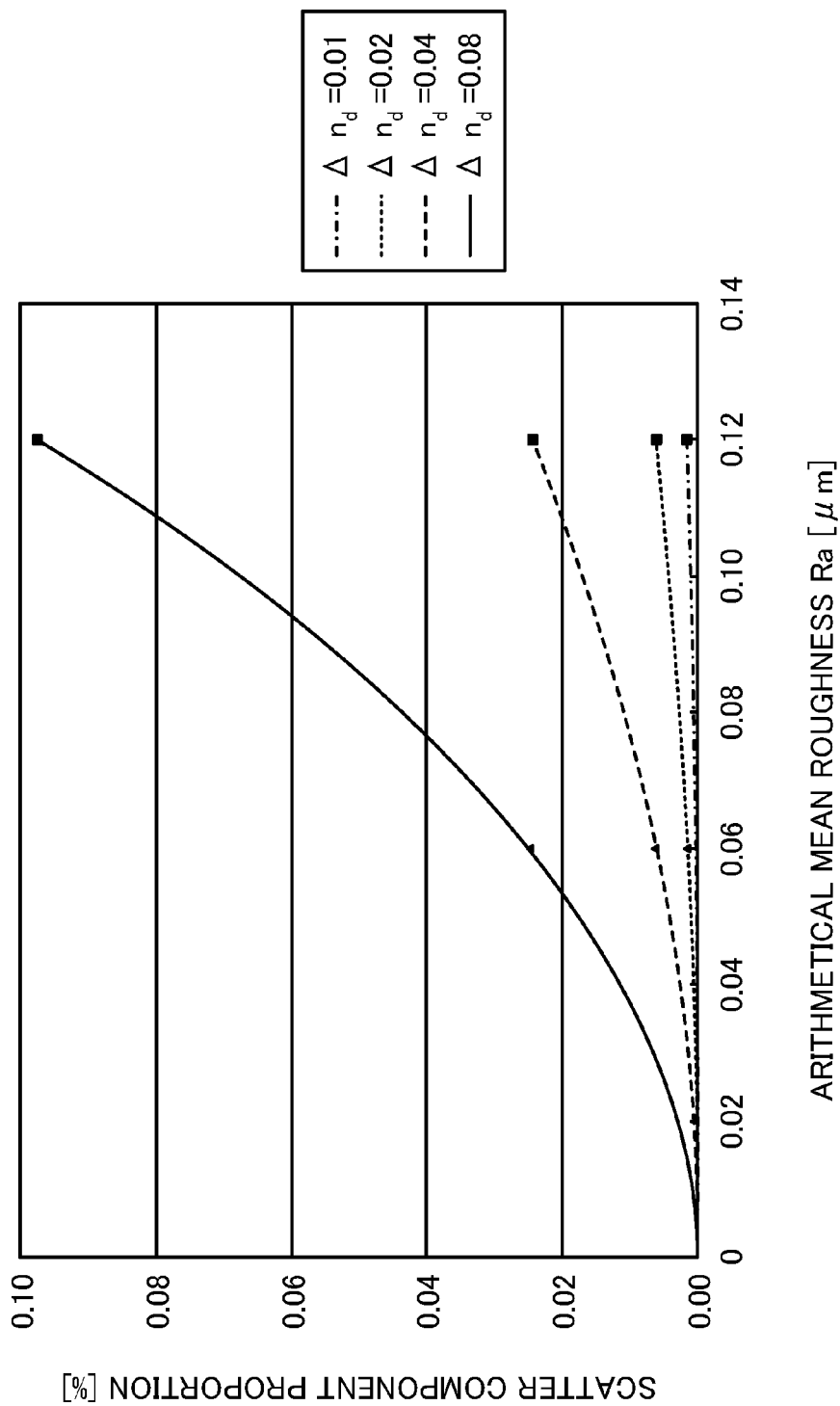

DIFFRACTIVE OPTICAL ELEMENT AND OPTICAL DEVICE

CROSS-REFERENCE TO RELATED APPLICATION

This application claims priority to Japanese Patent Application No. 2010-074039 filed on Mar. 29, 2010, the disclosure of which including the specification, the drawings, and the claims is hereby incorporated by reference in its entirety.

BACKGROUND

The present disclosure relates to a diffractive optical element in which two optical members are stacked, and a diffraction grating is formed at an interface between the two optical members, and to an optical device including the diffractive optical element.

A diffractive optical element has been known, in which a plurality of optical members are stacked in close contact with each other, and a relief pattern is formed at an interface between the optical members (see Japanese Patent Publication No. H09-127321).

In a diffractive optical element described in, e.g., Japanese Patent Publication No. H09-127321, a plurality of optical members are stacked, and a diffraction grating having a sawtooth cross section is formed at an interface between the optical members.

SUMMARY

At the interface where the diffraction grating is formed, an absolute value of a refractive index difference between mediums sandwiching the interface is smaller as compared to that at an interface between air and the optical member. Typically, a larger absolute value of a refractive index difference results in larger scattering at an interface. Thus, the scattering becomes smaller at the interface where the diffraction grating is formed. Since the scattering is smaller at the interface where the diffraction grating is formed, precise surface roughness as required for the interface between air and the optical member is not required for the interface where the diffraction grating is formed. Because a required surface roughness level is low, a manufacturing of the optical member is facilitated.

However, there is no findings regarding allowable surface roughness at the interface.

A technique disclosed herein has been made in view of the foregoing, and it is an objective of the present disclosure to facilitate a manufacturing of a close-contact type multilayer diffractive optical element while keeping scattering small.

A diffractive optical element disclosed herein includes a first optical member including a first diffraction grating having a sawtooth cross section; and a second optical member which includes a second diffraction grating having an inverted shape of the first diffraction grating and which has a refractive index different from that of the first optical member. The first and second optical members are stacked in a state in which the first and second diffraction gratings closely contact each other, and a diffraction surface of the first diffraction grating satisfies the following expression (1):

$$4 \times \mathrm{Ra\_s} \le \mathrm{Ra\_a} \le \frac{\mathrm{Ra\_s} \cdot |\Delta n_{d\_s}|}{|\Delta n_d|} \quad (1)$$

where "Ra_a" represents arithmetical mean roughness (μm) of the diffraction surface, "$\Delta n_d$" represents a refractive index difference between the first and second optical members, "Ra_s" represents arithmetical mean roughness (μm) of a surface causing the largest scattering among light entering surfaces other than the diffraction surface in the diffractive optical element, and "$\Delta n_{d\_s}$" represents a refractive index difference between mediums sandwiching the surface at which the scattering is largest.

A diffractive optical element disclosed herein includes a first optical member including a first diffraction grating having a sawtooth cross section; and a second optical member which includes a second diffraction grating having an inverted shape of the first diffraction grating and which has a refractive index different from that of the first optical member. The first and second optical members are stacked in a state in which the first and second diffraction gratings closely contact each other. The first diffraction grating is formed by a mold. An inverted structure of tool marks of the mold is formed in a diffraction surface of the first diffraction grating. The inverted structure is raised so as to have a segmental section. The diffraction surface of the first diffraction grating satisfies the following expression (2):

$$4 \times \mathrm{Ra\_s} \le R\left\{1 - \sqrt{1 - \left(\frac{P}{2R}\right)^2}\right\} \le \frac{\mathrm{Ra\_s} \cdot |\Delta n_{d\_s}|}{|\Delta n_d|} \quad (2)$$

where "R" represents a curvature radius (μm) of the cross section of the inverted structure, "P" represents a pitch (μm) of the inverted structure, $\Delta n_d$ represents a refractive index difference between the first and second optical members, "Ra_s" represents arithmetical mean roughness (μm) of a surface causing the largest scattering among light entering surfaces other than the diffraction surface in the diffractive optical element, and "$\Delta n_{d\_s}$" represents a refractive index difference between mediums sandwiching the surface at which the scattering is largest.

Further, a diffractive optical element disclosed herein includes a first optical member including a first diffraction grating having a sawtooth cross section; and a second optical member which includes a second diffraction grating having an inverted shape of the first diffraction grating and which has a refractive index different from that of the first optical member. The first and second optical members are stacked in a state in which the first and second diffraction gratings closely contact each other, and a diffraction surface of the first diffraction grating satisfies the following expression (3):

$$\frac{\lambda}{50} \le \mathrm{Ra\_a} \le \frac{\mathrm{Ra\_s} \cdot |\Delta n_{d\_s}|}{|\Delta n_d|} \quad (3)$$

where "λ" represents the shortest wavelength (μm) in a wavelength band to be used, "Ra_a" represents arithmetical mean roughness (μm) of the diffraction surface, "$\Delta n_d$" represents a refractive index difference between the first and second optical members, "Ra_s" represents arithmetical mean roughness (μm) of a surface causing the largest scattering among light entering surfaces other than the diffraction surface in the diffractive optical element, and "$\Delta n_{d\_s}$" represents a refractive index difference between mediums sandwiching the surface at which the scattering is largest.

An optical device disclosed herein includes an optical imaging system configured to focus light bundles on a predetermined surface. The optical imaging system includes the diffractive optical element.

According to the present disclosure, a manufacturing of the diffractive optical element can be facilitated while keeping the scattering small.

BRIEF DESCRIPTION OF THE DRAWINGS

FIG. 5 is a graph showing a relationship of arithmetical mean roughness and a refractive index difference with scattering.

DETAILED DESCRIPTION

Example embodiments of the present disclosure will be described below in detail with reference to the drawings.

Embodiments

Figure 1:
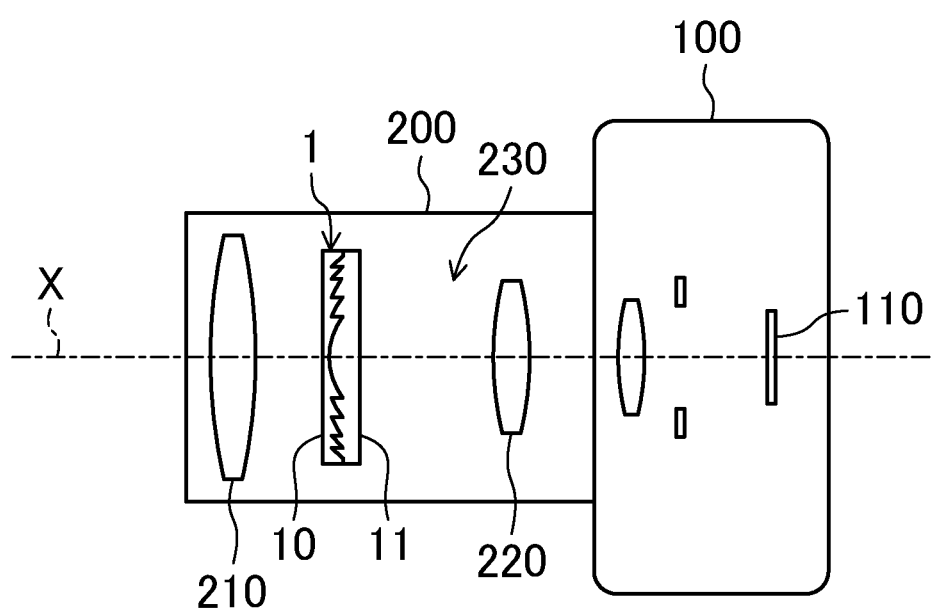
FIG. 1 is a schematic view of a camera to which an interchangeable lens of an embodiment of the present disclosure is attached.
Figure 2:
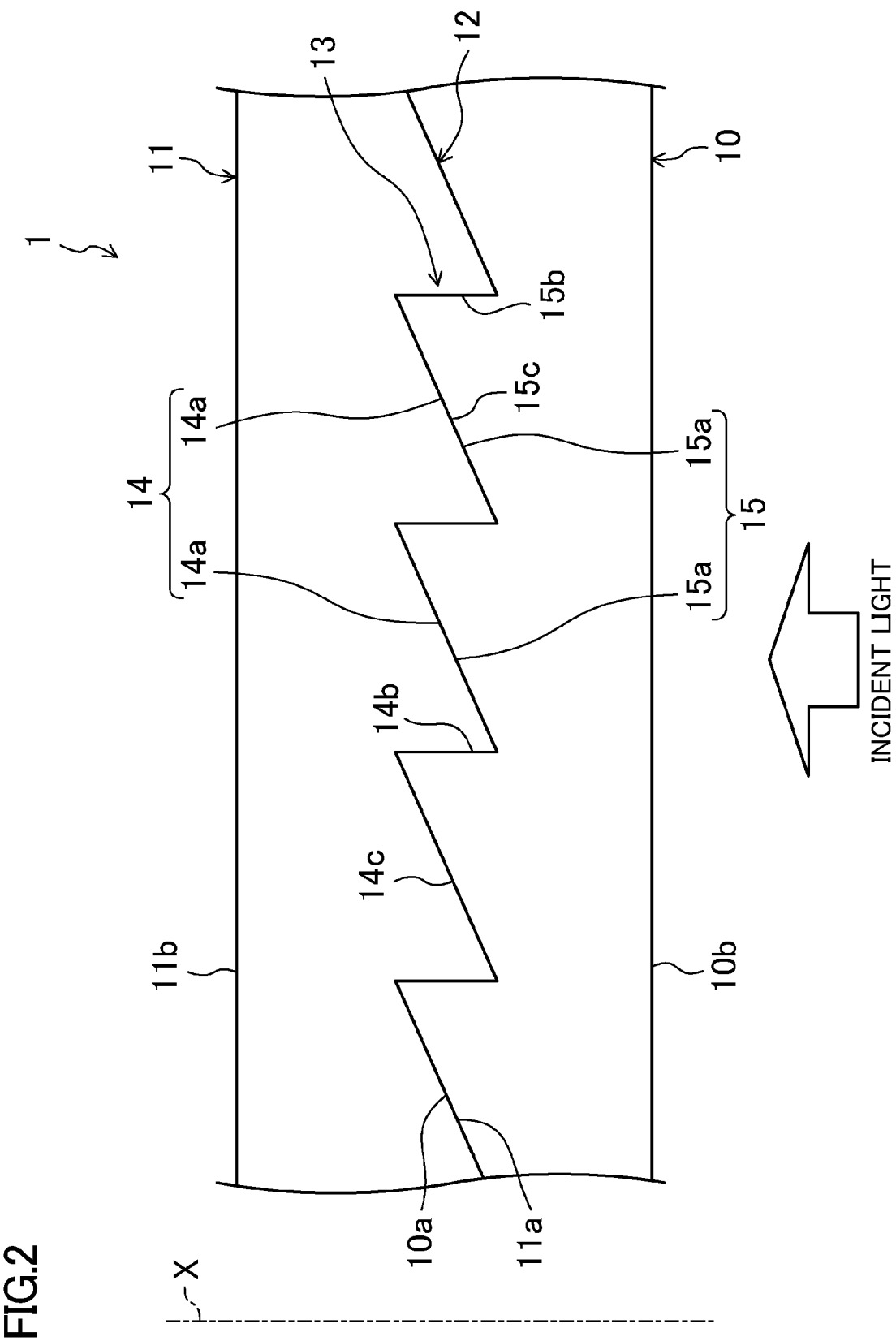
FIG. 2 is a schematic cross-sectional view of a diffractive optical element.

FIG. 1 is a schematic view of an interchangeable lens 200 including a diffractive optical element 1 of the example embodiment, and a camera 100 to which the interchangeable lens 200 is attached. FIG. 2 is a schematic cross-sectional view of the diffractive optical element 1.

The interchangeable lens 200 is detachable from the camera 100. The interchangeable lens 200 is, e.g., a telephoto zoom lens. In the interchangeable lens 200, the diffractive optical element 1 functions as a lens element in addition to refractive lenses 210, 220. The refractive lenses 210, 220 and the diffractive optical element 1 form an optical imaging system 230 configured to focus light bundles on an imaging device 110 of the camera 100. The interchangeable lens 200 forms an optical device.

The diffractive optical element 1 is a close-contact type multilayer diffractive optical element in which a first optical member 10 and a second optical member 11 having light transmission properties are stacked in close contact with each other. In the present embodiment, the first optical member 10 is made of glass, and the second optical member 11 is made of resin. Note that the materials of the first and second optical members 10, 11 are not limited to the foregoing materials. The first optical member 10 and the second optical member 11 are bonded together. A diffraction grating 13 having a sawtooth cross section is formed at an interface 12 defined by a bonding surface 10a of the first optical member 10 and a bonding surface 11a of the second optical member 11. Optical power of the diffraction grating 13 has wavelength dependency. Thus, the diffraction grating 13 provides the substantially same phase difference to light having different wavelengths, and diffracts the light having different wavelengths at diffraction angles which are different from each other. The diffraction grating 13 is formed of a first diffraction grating 14 formed in the bonding surface 10a of the first optical member 10 and having a sawtooth cross section, and a second diffraction grating 15 formed in the bonding surface 11a of the second optical member 11 and having a sawtooth cross section.

Specifically, the first diffraction grating 14 includes a plurality of ridge-like raised portions 14a which extend in a circumferential direction around an optical axis X of the diffractive optical element 1, and which are concentrically and regularly arranged around the optical axis X. Each of the raised portions 14a has a vertical surface 14b which is substantially parallel to the optical axis X (i.e., extends along the optical axis X), and a diffraction surface 14c which is inclined to the optical axis X (i.e., inclined to the vertical surface 14b). Each of the raised portions 14a has a substantially triangular cross section.

The second diffraction grating 15 includes a plurality of valley-like recessed portions 15a which extend in the circumferential direction around the optical axis X of the diffractive optical element 1, and which are concentrically and regularly arranged around the optical axis X. Each of the recessed portions 15a has a vertical surface 15b which is substantially parallel to the optical axis X, and a diffraction surface 15c which is inclined to the optical axis X. Each of the recessed portions 15a has a substantially triangular cross section.

The first diffraction grating 14 and the second diffraction grating 15 have the same grating height and the same grating pitch. That is, the second diffraction grating 15 has an inverted shape of the first diffraction grating 14, and the first diffraction grating 14 and the second diffraction grating 15 are engaged with each other in a state in which the raised portions 14a of the first diffraction grating 14 closely contact the recessed portions 15a of the second diffraction grating 15. Thus, the first diffraction grating 14 and the second diffraction grating 15 monolithically form the diffraction grating 13.

Note that the diffraction surface 14c of the first diffraction grating 14 and the diffraction surface 15c of the second diffraction grating 15 may be curved so as to define an aspherical or spherical surface.

A surface 10b of the first optical member 10 on an opposite side of the bonding surface 10a, and a surface 11b of the second optical member 11 on an opposite side of the bonding surface 11a are formed into flat surfaces parallel to each other. As illustrated in FIG. 1, e.g., light entering the diffractive optical element 1 from the first optical member 10 side is diffracted at the diffraction grating 13 (specifically the diffraction surfaces 14c, 15c) to exit to the second optical member 11 side. Note that the surface 10b of the first optical member 10 and the surface 11b of the second optical member 11 may not be parallel to each other.

Next, an example of a manufacturing method of the diffractive optical element 1 configured as described above will be briefly described. First, a mold having the inverted shape of the first diffraction grating 14 is prepared. The mold is filled with softened glass (e.g., glass heated to a temperature equal to or higher than a glass transition point or molten glass). Then, the first optical member 10 is molded. Subsequently, the first optical member 10 is arranged in another mold so that the first diffraction grating 14 faces an inside of the mold. The mold in which the first optical member 10 is arranged is filled with molten resin. Then, the second optical member 11 is stacked on the first diffraction grating 14 of the first optical member 10. In such a state, the molten resin flows into the valley portions of the first diffraction grating 14, thereby molding the second optical member 11 which has the second diffraction grating 15 contacting the first diffraction grating 14. Note that the manufacturing method is one example, and any manufacturing methods may be applied as long as the diffractive optical element 1 can be manufactured. For example, if the second optical member 11 is made of glass, the diffractive optical element 1 in which the second optical member 11 is stacked on the first optical member 10 may be manufactured as follows: a mold in which the first optical member 10 is arranged is filled with soften glass (e.g., glass heated to a temperature equal to or higher than a glass transition point or molten glass), and the soften glass is pressed against the first diffraction grating 14 of the first optical member 10. In either case of forming the second optical member 11 with resin or glass, soften optical material is deformed into a shape patterned after the first diffraction grating 14 of the first optical member 10, and the second diffraction grating 15 is formed in close contact with the first diffraction grating 14.

Even a microscopic recessed-raised structure of the diffraction surface 14c of the first diffraction grating 14 is transferred to the diffraction surface 15c of the second diffraction grating 15. Consequently, the recessed-raised structure of the diffraction surface 14c of the first diffraction grating 14 exactly fits the recessed-raised structure of the diffraction surface 15c of the second diffraction grating 15. In other words, even the microscopic recessed-raised structure of the diffraction surface 15c of the second diffraction grating 15 is formed in shape patterned after the diffraction surface 14c of the first diffraction grating 14. That is, a surface shape of the diffraction surface 15c of the second diffraction grating 15 is an inverted surface shape of the diffraction surface 14c of the first diffraction grating 14. Thus, surface roughness of the diffraction surface 14c of the first diffraction grating 14 is surface roughness at the interface 12 between the first optical member 10 and the second optical member 11. As will be described later, the surface roughness of the diffraction surfaces 14c, 15c has an influence on scattering at the diffraction surfaces 14c, 15c.

The surface roughness of the diffraction surface 14c of the first diffraction grating 14 is determined depending on surface roughness of the mold. That is, a surface shape of a portion corresponding to the diffraction surface 14c in the mold of the first optical member 10 is transferred to the diffraction surface 14c of the first diffraction grating 14. In other words, the surface roughness of the diffraction surface 14c of the first diffraction grating 14 is the substantially same as the surface roughness of the mold in the portion corresponding to the diffraction surface 14c.

The mold surface (particularly a surface having a complex shape such as the inverted shape of the first diffraction grating 14) is typically finished by cutting with a turning tool. Specifically, the turning tool having a curvature radius R at a tip end cuts the mold surface while moving with a predetermined fine pitch P. In such a manner, a plurality of grooves having an arc-shaped cross section with the radius R are formed as tool marks in the mold surface with the pitch P.

Figure 3:
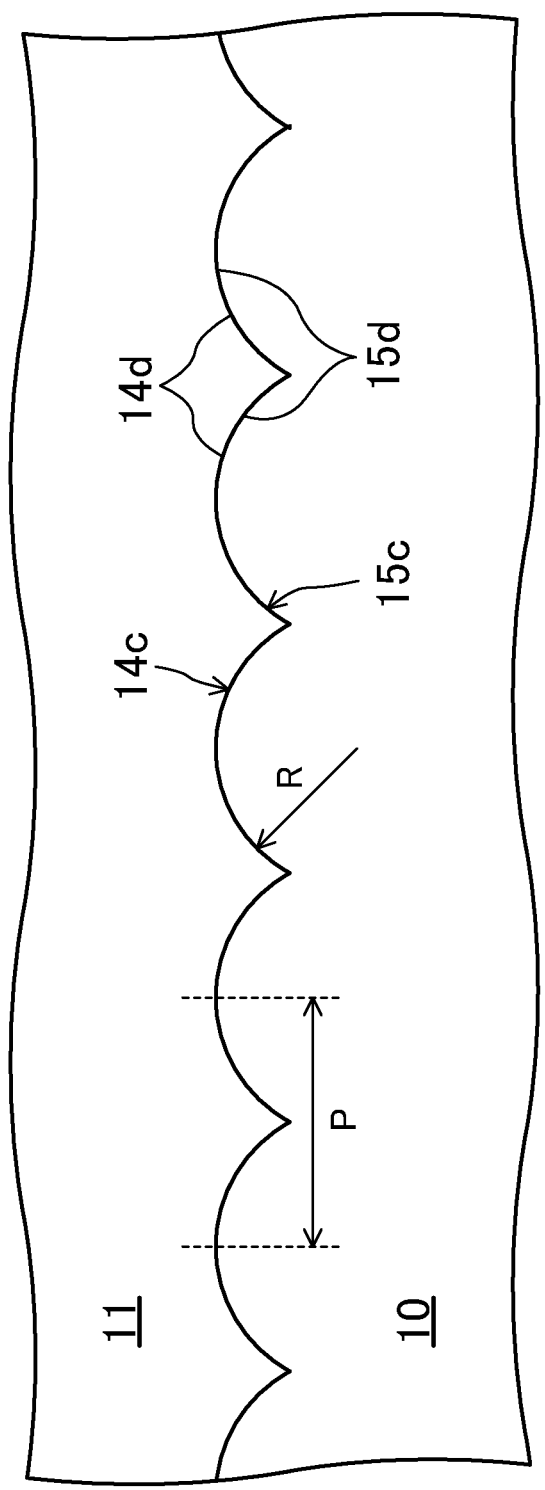
FIG. 3 is an enlarged cross-sectional view illustrating a detail of a structure at an interface between a first optical member and a second optical member.

As illustrated in FIG. 3, the tool marks of the mold surface are transferred to the diffraction surface 14c of the first diffraction grating 14 formed by the mold. FIG. 3 is a cross-sectional view of the first optical member 10 and the second optical member 11. For convenience of description, the diffraction surfaces 14c, 15c are drawn in the horizontal direction. Specifically, a plurality of raised striations 14d, each of which has the segmental cross section with the radius R, are formed in the diffraction surface 14c of the first optical member 10 with the pitch P. The striations 14d form an inverted structure of the tool marks. The surface shape of the diffraction surface 14c is transferred to the diffraction surface 15c of the second optical member 11, and therefore a plurality of grooves 15d, each of which has the arc-shaped cross section with the radius R, are formed in the diffraction surface 15c of the second optical member 11 with the pitch P. The striations 14d exactly fit the grooves 15d.

The curvature radius R at the tip end of the turning tool and the pitch P are determined depending on surface roughness required for the mold surface (i.e., surface roughness required for the diffraction surface 14c of the first diffraction grating 14) and a shape required for the ridge portion (a crest defined by the vertical surface 14b and the diffraction surface 14c) of the first diffraction grating 14. In the cutting, the curvature radius R at the tip end of the turning tool is increased, resulting in smaller surface roughness. On the other hand, the degree of sharpening at the valley bottom portion having the inverted shape of the ridge portion of the first diffraction grating 14 in the mold is determined depending on the curvature radius R at the tip end of the turning tool. That is, a larger curvature radius R at the tip end of the turning tool results in a rounder valley bottom portion of the mold. Consequently, the ridge portion of the first diffraction grating 14 is also rounded. The rounded ridge portion does not contribute to diffraction. Thus, the first diffraction grating 14 cannot properly diffract light, thereby degrading diffraction efficiency. In the view of the foregoing, it is necessary to decrease the curvature radius R at the tip end of the turning tool. However, if the curvature radius R at the tip end of the turning tool is decreased, the surface roughness becomes larger as described above. In order to avoid the large surface roughness, if the curvature radius R at the tip end of the turning tool is small, it is necessary to narrow the moving pitch of the turning tool. However, in such a case, a cutting distance by the turning tool (moving distance of the turning tool during the mold processing) is increased. The longer cutting distance may cause abrasion or breakage of the turning tool. In addition, due to the longer cutting distance, environmental conditions such as a temperature and a humidity during the mold processing are changed, thereby providing adverse effects on finished quality of the mold. As in such a case, it is not easy to manufacture the mold having the smaller surface roughness.

Considering the scattering at the diffraction surface 14c, the surface roughness of the diffraction surface 14c may not be so small. Specifically, if surface roughness at an interface becomes larger, scattering at such an interface is typically increased. However, a factor determining the degree of scattering is not only surface roughness at an interface but also a refractive index difference between mediums sandwiching the interface. That is, larger surface roughness at an interface and a larger absolute value of a refractive index difference between mediums sandwiching the interface result in larger scattering at the interface. The mediums sandwiching the diffraction surface 14c are the first optical member 10 and the second optical member 11. An absolute value of a refractive index difference between the mediums sandwiching the diffraction surface 14c is smaller than that between the surface 10b of the first optical member 10 or the surface 11b of the second optical member 11 and air. In the case where the absolute value of the refractive index difference between the mediums sandwiching the interface is small, even if the surface roughness at the interface becomes somewhat larger, the scattering at the interface is not significantly increased.

The surface roughness of the diffraction surface 14c of the first diffraction grating 14 satisfies the following expression (1):

$$4 \times \text{Ra\_s} \leq \text{Ra\_a} \leq \frac{\text{Ra\_s} \cdot |\Delta n_{d\_s}|}{|\Delta n_d|} \qquad (1)$$

where "Ra_a" represents arithmetical mean roughness (μm) of the diffraction surface 14c, "$\Delta n_d$" represents a refractive index difference between the first optical member 10 and the second optical member 11, "Ra_s" represents arithmetical mean roughness (μm) of a surface causing the largest scattering among light entering surfaces other than the diffraction surface 14c in the diffractive optical element 1, and "$\Delta n_{d\_s}$" represents a refractive index difference between mediums sandwiching the surface at which the scattering is largest.

That is, in the present embodiment, the arithmetical mean roughness Ra_a of the diffraction surface 14c is set to equal to or greater than 4×Ra_s. In other words, the arithmetical mean roughness Ra_a of the diffraction surface 14c may be more than four times larger than the arithmetical mean roughness Ra_s of the surface causing the largest scattering among light entering surfaces other than the diffraction surface 14c in the diffractive optical element 1. Thus, if the arithmetical mean roughness Ra_a of the diffraction surface 14c is equal to or greater than 4×Ra_s, arithmetical mean roughness Ra of the mold surface may be also equal to or greater than 4×Ra_s. In such a case, the cutting distance during the mold processing is substantially half as compared to a case where the arithmetical mean roughness Ra of the mold surface is Ra_s (i.e., a case where the mold is processed so as to have surface roughness equal to that of the surface causing the largest scattering among light entering surfaces other than the diffraction surface 14c in the diffractive optical element 1). Consequently, the mold can be easily manufactured, thereby facilitating the manufacturing (including the manufacturing of the mold) of the diffractive optical element 1.

Specifically, in the diffractive optical element 1 in which the first and second optical members 10, 11 are stacked, the surface causing the largest scattering among light entering surfaces other than the diffraction surface 14c in the diffractive optical element 1 is the surface 10b of the first optical member 10 or the surface 11b of the second optical member 11. The surfaces 10b, 11b are interfaces with air, and arithmetical mean roughness Ra of the surfaces 10b, 11b is typically set to about 0.002 μm. In a method for measuring surface roughness, such as an optical interference method, an asperity of about 0.0025-0.005 μm is a typically limit of the measurement. In other words, light cannot recognize an asperity smaller than about 0.0025-0.005 μm. Thus, an interface with air, at which light enters is typically set to arithmetical mean roughness Ra of about 0.002 μM in order to reduce scattering.

As a result, the expression (1) provides the following expression (4):

$$0.008 \; [\mu m] \leq Ra\_a \leq \frac{Ra\_s \cdot |\Delta n_{d\_s}|}{|\Delta n_d|} \quad (4)$$

That is, the arithmetical mean roughness Ra_a of the diffraction surface 14c is set to equal to or greater than 0.008 μm. The surface roughness of the diffraction surface 14c may be significantly larger as compared to the arithmetical mean roughness Ra of the surfaces 10b, 11b which are the interfaces with air. Thus, if the arithmetical mean roughness Ra_a of the diffraction surface 14c is equal to or greater than 0.008 μm, the arithmetical mean roughness Ra of the mold surface may be also equal to or greater than 0.008 μm. In such a case, the cutting distance during the mold processing is substantially half as compared to a case where the arithmetical mean roughness Ra of the mold surface is about 0.002 μm. Consequently, the mold can be easily manufactured, thereby facilitating the manufacturing (including the manufacturing of the mold) of the diffractive optical element 1.

Meanwhile, an upper limit of the arithmetical mean roughness Ra_a of the diffraction surface 14c is set as in the expression (1), thereby keeping the scattering small at the diffraction surface 14c. That is, as described above, a larger surface roughness at an interface and a larger absolute value of a refractive index difference between mediums sandwiching the interface result in larger scattering at the interface. As will be described in detail later, a product of the arithmetical mean roughness Ra and the absolute value of the refractive index difference $\Delta n_d$ can be used as a parameter representing the degree of scattering (hereinafter referred to as a "scattering parameter"). That is, a greater scattering parameter results in larger scattering at an interface. The diffraction surface 14c is configured so that a scattering parameter at the diffraction surface 14c is equal to or less than a scattering parameter at a surface causing the largest scattering among light entering surfaces other than the diffraction surface 14c in the diffractive optical element 1 (hereinafter referred to as a "maximum scattering surface"). That is, a relationship between the scattering parameter at the diffraction surface 14c and the scattering parameter at the maximum scattering surface (e.g., the surface 10b of the first optical member 10) satisfies the following expression (5):

$$Ra\_a \cdot \Delta n_d \leq Ra\_s \cdot \Delta n_{d\_s} \quad (5)$$

The expression (5) is rearranged for the arithmetical mean roughness Ra_a of the diffraction surface 14c, thereby specifying the upper limit obtained by the expression (1). That is, if the arithmetical mean roughness Ra_a of the diffraction surface 14c is set to equal to or less than the upper limit obtained by the expression (1), the scattering at the first diffraction grating 14 can be kept smaller at least as compared to the scattering at the maximum scattering surface.

Thus, the first diffraction grating 14 is configured so that the arithmetical mean roughness Ra_a of the diffraction surface 14c satisfies the expression (1), thereby keeping the scattering small and facilitating the manufacturing of the diffractive optical element 1.

As described above, the tool marks of the mold are transferred to the diffraction surface 14c of the first optical member 10, and the striations 14d are formed in the diffraction surface 14c of the first optical member 10 as the inverted structure of the tool marks. When a curvature radius in a cross section of the striation 14d of the diffraction surface 14c is "R (μm)," and a pitch between the striations 14d is "P (μm)," the first diffraction grating 14 satisfies the following expression (2):

$$4 \times Ra\_s \leq R\left\{1 - \sqrt{1 - \left(\frac{P}{2R}\right)^2}\right\} \leq \frac{Ra\_s \cdot |\Delta n_{d\_s}|}{|\Delta n_d|} \quad (2)$$

If the plurality of raised striations 14d, each of which has the segmental cross section with the radius R, are formed in the diffraction surface 14c with the pitch P, the arithmetical mean roughness Ra_a of the diffraction surface 14c is represented by the following expression (6):

$$Ra\_a = R\left\{1 - \sqrt{1 - \left(\frac{P}{2R}\right)^2}\right\} \quad (6)$$

That is, by substituting the expression (6) into the expression (1), the expression (2) is obtained. If the first diffraction grating 14 is configured so that not the arithmetical mean roughness Ra_a of the diffraction surface 14c but the curvature radius R and the pitch P in the inverted structure of the tool marks transferred to the diffraction surface 14c satisfy the relationship of the expression (2), as described above, the manufacturing of the diffractive optical element 1 can be facilitated while keeping the scattering small.

Note that, if arithmetical mean roughness Ra of the surface causing the largest scattering among light entering surfaces other than the diffraction surface 14c in the diffractive optical element 1 is 0.002 μm, the expression (2) provides the following expression (7):

$$0.008 \ [\mu m] \leq R\left\{1 - \sqrt{1 - \left(\frac{P}{2R}\right)^2}\right\} \leq \frac{Ra\_s \cdot |\Delta n_{d\_s}|}{|\Delta n_d|} \quad (7)$$

Further, the arithmetical mean roughness Ra_a of the diffraction surface 14c of the first diffraction grating 14 may be set so as to satisfy the following expression (3) when the shortest wavelength in the wavelength band to be used is λ (μm):

$$\frac{\lambda}{50} \leq Ra\_a \leq \frac{Ra\_s \cdot |\Delta n_{d\_s}|}{|\Delta n_d|} \quad (3)$$

According to the expression (3), the arithmetical mean roughness Ra_a of the diffraction surface 14c is set to equal to or greater than λ/50. If a target for the diffractive optical element 1 is visible light, the wavelength band to be used is about 400-800 nm. In such a case, a lower limit of the arithmetical mean roughness Ra_a of the diffraction surface 14c is about 0.008 μm. As described above, such a limit is four times as large as the typical value of the arithmetical mean roughness Ra at the interface with air (0.002 μm), and is a value at which the cutting distance during the mold processing is substantially half as compared to the cutting distance at such an interface. Thus, the manufacturing (including the manufacturing of the mold) of the diffractive optical element 1 can be facilitated.

If the inverted structure of the tool marks, which is transferred to the diffraction surface 14c is the striation 14d having the curvature radius R and the pitch P, the expression (3) provides the following expression (8):

$$\frac{\lambda}{50} \leq R\left\{1 - \sqrt{1 - \left(\frac{P}{2R}\right)^2}\right\} \leq \frac{Ra\_s \cdot |\Delta n_{d\_s}|}{|\Delta n_d|} \quad (8)$$

That is, the first diffraction grating 14 is configured so that the curvature radius R and the pitch P of the inverted structure of the tool marks, which is transferred to the diffraction surface 14c satisfy a relationship of the expression (8). This facilitates the manufacturing of the diffractive optical element 1 while keeping the scattering small as described above.

Figure 4:
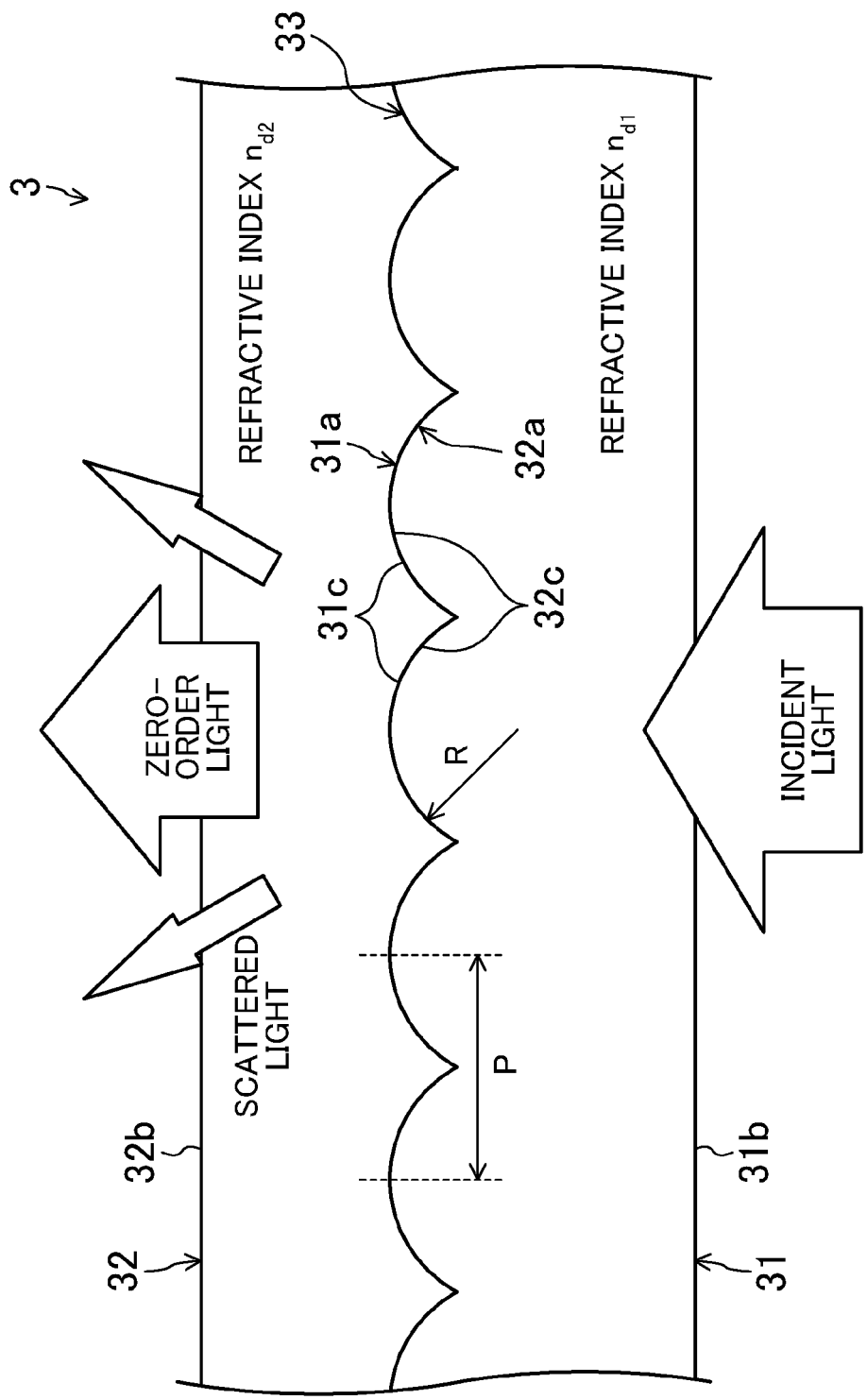
FIG. 4 is a cross-sectional view illustrating a model in a simulation of a calculation of scatter components.

A relationship of surface roughness at an interface and a refractive index difference between mediums sandwiching the interface with scattering will be described with reference to FIGS. 4 and 5. FIG. 4 illustrates a model of a multilayer optical element used for a simulation, and FIG. 5 illustrate results of the scattering simulation.

First, suppose that a model 3 illustrated in FIG. 4 was used. In the model 3, a first optical member 31 and a second optical member 32 are stacked, and a recessed-raised structure is formed at an interface 33 between the first optical member 31 and the second optical member 32. Specifically, a plurality of raised striations 31c, each of which has a segmental cross section with a radius R, are formed at an interface 31a of the first optical member 31 with a pitch P. On the other hand, a plurality of grooves 32c, each of which has the arc-shaped cross section with the radius R, are formed at an interface 32a of the second optical member 32 with the pitch P. The first optical member 31 and the second optical member 32 are stacked in a state in which the striations 31c at the interface 31a and the grooves 32c at the interface 32a closely contact each other. A refractive index at a d line (0.587562 μm) of the first optical member 31 is "$n_{d1}$," and a refractive index at a d line of the second optical member 32 is "$n_{d2}$ ($<n_{d1}$)." Suppose that light at the d line enters the first optical member 31 through a surface 31b, and exits from the second optical member 32 through a surface 32b. At this point, a part of the light is scattered at the interface 31a (32a). A proportion of scatter components was calculated by a rigorous coupled-wave analysis (RCWA) method while changing arithmetical mean roughness Ra of the interface 31a (32a) and a refractive index difference $\Delta n_d$ ($=n_{d1}-n_{d2}$) at the interface 31a (32a). A proportion of a scattered light amount to a total transmitted light amount (=a zero-order light amount+a total scattered light amount) was considered as the proportion of scatter components. Specifically, the pitch P was set to about 0.001 μm, and the radius R was changed within a range of about 1.1 μm-about 62.5 μm, thereby changing the arithmetical mean roughness Ra of the interface 31a (32a). Note that Ra=about 0.120 μm when R=about 1.1 μm, or Ra=about 0.002 μm when R=about 62.5 μm. The arithmetical mean roughness Ra was calculated based on the radius R in the cross section and the pitch P by using the expression (3). The refractive index $n_{d1}$ of the first optical member 31 was fixed to about 1.7 (equivalent to a refractive index of glass K—LaFn3 manufactured by Sumita Optical Glass Inc.), and the refractive index $n_{d2}$ of the second optical member 32 was changed. Consequently, the refractive index difference $\Delta n_d$ was changed.

As can be appreciated from the simulation results of FIG. 5, greater arithmetical mean roughness Ra results in an increase in proportion of scatter components. In addition, a greater absolute value of a refractive index difference $\Delta n_d$ results in a greater proportion of scatter components. For example, when an absolute value of the refractive index difference $\Delta n_d$ is reduced by half, arithmetical mean roughness Ra is substantially doubled. That is, when an absolute value of the refractive index difference $\Delta n_d$ is in 1/n, arithmetical mean roughness Ra is multiplied by n times in order to realize the substantially same degree of scattering as that before changing the absolute value of the refractive index difference $\Delta n_d$. Thus, the substantially same scattering parameters (surface roughness Ra at the center line×an absolute value of the refractive index difference $\Delta n_d$) produce the substantially same degree of scattering. That is, the upper limit of the arithmetical mean roughness Ra_a of the diffraction surface 14c is set as in the expression (1), and therefore scattering at the diffraction surface 14c can be kept to substantially equal to or less than scattering at the maximum scattering surface of the diffractive optical element 1.

EXAMPLES

Examples of the diffractive optical element will be described below.

First Example

In a first example, a first optical member 10 was made of hypothetical glass having a refractive index $n_1(\lambda_d)$ of about 1.57 and an Abbe number $v_{d1}$ of about 71.2 at a d line, and a second optical member 11 was made of hypothetical resin having a refractive index $n_2(\lambda_d)$ of about 1.54 and an Abbe number $v_{d2}$ of about 42.1 at the d line. Consequently, a refractive index difference $\Delta n_d$ of about 0.03 was obtained. A blaze wavelength $\lambda_b$ was set to the d line. In such a state, a grating height was about 19.59 (μm). In addition, a pitch P of a diffraction grating was about 0.1 (mm). In order to realize higher diffraction efficiency, a curvature radius R of a ridge portion of the diffraction grating was set to about 10 (μm). That is, a condition was assumed, in which a turning tool having a curvature radius of about 10 (μm) at a tip end cuts a mold for the diffraction grating.

Suppose that, e.g., a mold corresponding to a the first optical member 10 having a diffraction surface diameter of about 60 (mm) is processed. If the mold is processed by the turning tool having the curvature radius of about 10 (μm) at the tip end so that arithmetical mean roughness Ra of a mold surface is equal to or less than about 0.002 (μm) required for a typical optical element surface, a moving pitch of the turning tool is about 0.40 (μm), and a cutting distance is equal to or longer than about 7000 (m). However, in the case where the refractive index difference $\Delta n_d$ between mediums sandwiching the diffraction surface is about 0.03 as in the present example, if a surface 10b of the first optical member 10 is a surface at which scattering is largest, and arithmetical mean roughness Ra of the surface 10b is about 0.002 (μm) (the value required for the typical optical element surface), the arithmetical mean roughness Ra at of the mold surface may be equal to or less than about 0.038 (μm) based on the expression (1). If the mold surface is processed by the turning tool having the curvature radius of about 10 (μm) at the tip end so that the arithmetical mean roughness Ra is about 0.038 (μm), the moving pitch of the turning tool is about 1.74 (μm). Consequently, a cutting distance of about 1600 (m) is obtained. The cutting distance is significantly shortened as compared to the case where the arithmetical mean roughness is about 0.002 (μm).

By forming the first optical member 10 with the mold formed in this manner, a diffraction surface 14c of the first optical member 10 has surface roughness similar to that of the mold. That is, arithmetical mean roughness Ra of the diffraction surface 14c is about 0.038 (μm). If the diffraction surface 14c contacts air, and a proportion of scatter components is calculated by a simulation using the RCWA method, about 0.50(%) of light at the d line, which vertically enters the diffraction surface 14c is changed into scattered light. On the other hand, if the second optical member 11 having a refractive index difference $\Delta n_d$ of about 0.03 from the first optical member 10 is stacked on the first optical member 10, about 0.01(%) or less of the light at the d line, which vertically enters the diffraction surface 14c is changed into scattered light. As compared to the case where the diffraction surface 14c contacts airspace, the scattering is significantly reduced.

Second Example

In a second example, a first optical member 10 was made of glass (glass K-VC78 manufactured by Sumita Optical Glass Inc.) having a refractive index $n_1(\lambda_d)$ of about 1.66955 and an Abbe number $v_{d1}$ of about 55.4 at a d line, and a second optical member 11 was made of hypothetical resin having a refractive index $n_2(\lambda_d)$ of about 1.606 and an Abbe number $v_{d2}$ of about 27.3 at the d line. Consequently, a refractive index difference $\Delta n_d$ of about 0.06355 was obtained. A blaze wavelength $\lambda_b$ was set to the d line. In such a state, a grating height was about 9.25 (μm). In addition, a pitch P of a diffraction grating was about 0.4 (mm). In order to realize higher diffraction efficiency, a curvature radius R of a ridge portion of the diffraction grating was set to about 15 (μm). That is, a condition was assumed, in which a turning tool having a curvature radius of about 15 (μm) at a tip end cuts a mold for the diffraction grating.

Suppose that, e.g., a mold corresponding to a the first optical member 10 having a diffraction surface diameter of about 80 (mm) is processed. If the mold is processed by the turning tool having the curvature radius of about 15 (μm) at the tip end so that arithmetical mean roughness Ra of a mold surface is equal to or less than about 0.002 (μm), a moving pitch of the turning tool is about 0.49 (μm), and a cutting distance is equal to or longer than about 10000 (m). However, in the case where the refractive index difference $\Delta n_d$ between mediums sandwiching the diffraction surface is about 0.06355 as in the present example, if a surface 10b of the first optical member 10 is a surface at which scattering is largest, and arithmetical mean roughness Ra of the surface 10b is about 0.002 (μm) (a value required for a typical optical element surface), the arithmetical mean roughness Ra of the mold surface may be equal to or less than about 0.021 (μm) based on the expression (1). If the mold surface is processed by the turning tool having the curvature radius of about 15 (μm) at the tip end so that the arithmetical mean roughness Ra is about 0.021 (μm), the moving pitch of the turning tool is about 1.59 (μm). Consequently, a cutting distance of about 3200 (m) is obtained. The cutting distance is significantly shortened as compared to the case where the arithmetical mean roughness is about 0.002 (μm).

By forming the first optical member 10 with the mold formed in this manner, a diffraction surface 14c of the first optical member 10 has surface roughness similar to that of the mold. That is, arithmetical mean roughness Ra of the diffraction surface 14c is about 0.021 (μm). If the diffraction surface 14c contacts air, and a proportion of scatter components is calculated by a simulation using the RCWA method, about 0.22(%) of light at the d line, which vertically enters the diffraction surface 14c is changed into scattered light. On the other hand, if the second optical member 11 having a refractive index difference $\Delta n_d$ of about 0.06355 from the first optical member 10 is stacked on the first optical member 10, about 0.01(%) or less of the light at the d line, which vertically enters the diffraction surface 14c is changed into scattered light. As compared to the case where the diffraction surface 14c contacts airspace, the scattering is significantly reduced.

Third Example

Suppose that a mold surface for a diffraction grating is cut by a turning tool having a curvature radius of about 20 (μm) at its tip end, with a pitch with which arithmetical mean roughness Ra is about 0.008 (μm); and that a first optical member 10 is formed with such a mold. In addition, suppose that a refractive index $n_1(\lambda_d)$ of the first optical member 10 at a d line is about 1.85, and an Abbe number $v_{d1}$ is about 42. An amount of scattered light when light having a wavelength of about 400 nm vertically enters a diffraction surface of the first optical member 10 configured in this manner was simulated by the RCWA method. The wavelength of about 400 nm is the shortest wavelength when light to be used is visible light.

If the diffraction surface of the first optical member 10 contacts air, about 0.11(%) of the light vertically entering the diffraction surface and having the wavelength of about 400 nm becomes scattered light. On the other hand, if the diffraction surface of the first optical member 10 contacts an optical member having a refractive index $n_1(\lambda_d)$ of about 1.70 and an Abbe number $v_{d1}$ of about 17 at the d line, less than about 0.01(%) of the light vertically entering the diffraction surface and having the wavelength of about 400 nm becomes scattered light. This shows that the scattering is significantly reduced as compared to the case where the diffraction surface contacts air.

Other Embodiments

The present disclosure may have the following configurations in the foregoing embodiment.

That is, in the foregoing embodiment, the diffractive optical element 1 is employed in the interchangeable lens 200, but the present disclosure is not limited to such a configuration. The diffractive optical element 1 may be applied as a lens element inside the camera 100. In addition, the present disclosure is not limited to the diffractive optical element 1 serving as a lens, and the diffractive optical element 1 may be applied for purposes other than the foregoing purpose.

The shape of the first and second diffraction gratings 14, 15 is not limited to that in the foregoing embodiment. That is, the first and second diffraction gratings 14, 15 may be formed in any shapes as long as the first and second diffraction gratings 14, 15 has the sawtooth cross section.

Further, the shape of the first and second diffraction gratings 14, 15 may be rectangular in cross section, or trapezoidal in cross section.

In the foregoing embodiment, the first optical member 10 is made of resin material, and the second optical member 11 is made of glass material. However, the present disclosure is not limited to such a configuration. The first optical member 10 may be made of glass material, and the second optical member 11 may be made of resin material, or both of the first and second optical members 10, 11 may be made of glass material or resin material. Alternatively, transparent ceramic may be used instead of glass material and resin material. In short, the first and second optical members 10, 11 may be made of material having transparency in a wavelength band to be used.

In a case where the inverted structure of the tool marks formed in the mold by the turning tool is also formed in the maximum scattering surface of the diffractive optical element 1, if a curvature radius of a cross section of the inverted structure of the tool marks in the maximum scattering surface is "R_s," and a pitch in such an inverted structure is "P_s," the first diffraction grating 14 may satisfy the following expression (9):

$$4 \times A \leq R\left\{1 - \sqrt{1 - \left(\frac{P}{2R}\right)^2}\right\} \leq A \cdot \frac{|\Delta n_{d\_s}|}{|\Delta n_d|} \quad (9)$$

where "A" is a value satisfying the following expression (10):

$$A = R\_s\left\{1 - \sqrt{1 - \left(\frac{P\_s}{2 \cdot R\_s}\right)^2}\right\} \quad (10)$$

Note that a lower limit of the expression (9) may be about 0.008 (μm), or may be λ/50 when the shortest wavelength in the wavelength band to be used is λ.

If the diffractive optical element 1 and other optical elements such as lenses together form an optical system, the maximum scattering surface may be a surface causing the largest scattering among light entering surfaces other than the diffraction surface 14c of the diffractive optical element 1 in the optical system.

The foregoing embodiments have been set forth merely for purposes of preferred examples in nature, and are not intended to limit the scope, applications, and use of the present disclosure.

As described above, the present disclosure is useful for the diffractive optical element in which the two optical members are stacked, and the diffraction grating is formed at the interface between the two optical members, and for the optical device including the diffractive optical element.

What is claimed is:

1. A diffractive optical element, comprising:
a first optical member including a first diffraction grating having a sawtooth cross section; and
a second optical member which includes a second diffraction grating having an inverted shape of the first diffraction grating and which has a refractive index different from that of the first optical member,
wherein the first and second optical members are stacked in a state in which the first and second diffraction gratings closely contact each other, and
a diffraction surface of the first diffraction grating satisfies the following expression (1):

$$4 \times \text{Ra\_s} \leq \text{Ra\_a} \leq \frac{\text{Ra\_s} \cdot |\Delta n_{d\_s}|}{|\Delta n_d|} \quad (1)$$

where "Ra_a" represents arithmetical mean roughness (μm) of the diffraction surface,
"$\Delta n_d$" represents a refractive index difference between the first and second optical members,
"Ra_s" represents arithmetical mean roughness (μm) of a surface causing the largest scattering among light entering surfaces other than the diffraction surface in the diffractive optical element, and
"$\Delta n_{d\_s}$" represents a refractive index difference between mediums sandwiching the surface at which the scattering is largest.

2. An optical device, comprising:
an optical imaging system configured to focus light bundles on a predetermined surface,
wherein the optical imaging system includes the diffractive optical element of claim 1.

3. A diffractive optical element, comprising:
a first optical member including a first diffraction grating having a sawtooth cross section; and
a second optical member which includes a second diffraction grating having an inverted shape of the first diffraction grating and which has a refractive index different from that of the first optical member,
wherein the first and second optical members are stacked in a state in which the first and second diffraction gratings closely contact each other,
the first diffraction grating is formed by a mold,
an inverted structure of tool marks of the mold is formed in a diffraction surface of the first diffraction grating,
the inverted structure is raised so as to have a segmental section, and
the diffraction surface of the first diffraction grating satisfies the following expression (2):

$$4 \times \text{Ra\_s} \leq R\left\{1 - \sqrt{1 - \left(\frac{P}{2R}\right)^2}\right\} \leq \frac{\text{Ra\_s} \cdot |\Delta n_{d\_s}|}{|\Delta n_d|} \quad (2)$$

where "R" represents a curvature radius (μm) of the cross section of the inverted structure, "P" represents a pitch (μm) of the inverted structure, "$\Delta n_d$" represents a refractive index difference between the first and second optical members, "Ra_s" represents arithmetical mean roughness (μm) of a surface causing the largest scattering among light entering surfaces other than the diffraction surface in the diffractive optical element, and "$\Delta n_{d\_s}$" represents a refractive index difference between mediums sandwiching the surface at which the scattering is largest.

4. A diffractive optical element, comprising:

a first optical member including a first diffraction grating having a sawtooth cross section; and a second optical member which includes a second diffraction grating having an inverted shape of the first diffraction grating and which has a refractive index different from that of the first optical member, wherein the first and second optical members are stacked in a state in which the first and second diffraction gratings closely contact each other, and a diffraction surface of the first diffraction grating satisfies the following expression (3):

$$\frac{\lambda}{50} \leq \text{Ra\_a} \leq \frac{\text{Ra\_s} \cdot |\Delta n_{d\_s}|}{|\Delta n_d|} \quad (3)$$

where "λ" represents the shortest wavelength (μm) in a wavelength band to be used, "Ra_a" represents arithmetical mean roughness (μm) of the diffraction surface, "$\Delta n_d$" represents a refractive index difference between the first and second optical members, "Ra_s" represents arithmetical mean roughness (μm) of a surface causing the largest scattering among light entering surfaces other than the diffraction surface in the diffractive optical element, and "$\Delta n_{d\_s}$" represents a refractive index difference between mediums sandwiching the surface at which the scattering is largest.

\* \* \* \* \*